United States Patent [19]

Nachtkamp et al.

[11] 4,373,081

[45] Feb. 8, 1983

[54] COATING COMPOSITIONS AND PROCESS FOR THE PRODUCTION OF POLYURETHANE COATINGS

[75] Inventors: Klaus Nachtkamp, Cologne; Manfred Bock; Gerhard Mennicken, both of Leverkusen; Josef Pedain, Cologne, all of Fed. Rep. of Germany

[73] Assignee: Bayer Aktiengesellschaft, Leverkusen, Fed. Rep. of Germany

[21] Appl. No.: 325,242

[22] Filed: Nov. 27, 1981

[30] Foreign Application Priority Data

Dec. 10, 1980 [DE] Fed. Rep. of Germany ....... 3046409

[51] Int. Cl.³ ...................... C08G 18/80; B22B 27/40
[52] U.S. Cl. .................. 528/45; 428/425.8; 428/423.1
[58] Field of Search .......................................... 528/45

[56] References Cited

U.S. PATENT DOCUMENTS

| | | | |
|---|---|---|---|
| 2,801,990 | 8/1957 | Seeger et al. | 260/75 |
| 3,770,703 | 11/1973 | Gruber et al. | 260/77.5 TB |
| 3,773,729 | 11/1973 | Wakimoto et al. | 528/45 |
| 3,779,794 | 12/1973 | De Santis | 428/425.6 |
| 4,007,215 | 2/1977 | Hartmann et al. | 260/468 J |
| 4,039,517 | 8/1977 | Hamamura et al. | 528/45 |
| 4,087,392 | 5/1978 | Hartmann et al. | 260/24 |
| 4,101,473 | 8/1978 | Lander | 528/45 |
| 4,101,530 | 7/1978 | Burkhardt et al. | 528/45 |
| 4,132,843 | 1/1979 | Dalibor | 528/45 |
| 4,332,965 | 6/1982 | Dalibor | 528/45 |

FOREIGN PATENT DOCUMENTS

| | | |
|---|---|---|
| 2342603 | 6/1975 | Fed. Rep. of Germany . |
| 2550156 | 5/1977 | Fed. Rep. of Germany . |
| 2612785 | 6/1977 | Fed. Rep. of Germany . |
| 2612784 | 8/1977 | Fed. Rep. of Germany . |
| 2612783 | 9/1977 | Fed. Rep. of Germany . |
| 2623081 | 11/1977 | Fed. Rep. of Germany . |
| 2639491 | 2/1978 | Fed. Rep. of Germany . |
| 1043008 | 11/1953 | France . |
| 2280697 | 2/1976 | France . |
| 1442024 | 7/1976 | United Kingdom . |

OTHER PUBLICATIONS

Vieweg/Hoechtlen–Polyurethane (Kunststoff–Handbuch, vol. VII, Carl Hanser Verlag, (Munich) 1966, pp. 11–13 and 21–24.

*Primary Examiner*—H. S. Cockeram
*Attorney, Agent, or Firm*—Gene Harsh; Lawrence S. Pope; Thomas W. Roy

[57] ABSTRACT

The present invention relates to thermally cross-linkable coating compositions which are liquid and stable in storage at room temperature and which contain combinations of dialkyl-malonate-blocked polyisocyanates and organic polyhydroxyl compounds as binders and, optionally, auxiliaries and additives, being characterized in that the binder comprises:

(a) a polyisocyanate component containing dialkyl-malonate-blocked isocyanate groups and a content of blocked isocyanate groups, expressed as NCO, based on the weight of the polyisocyanate component excluding the weight of the blocking agent, of from about 3 to 33.6% by weight, comprising
  (aa) at least one dialkyl-malonate-blocked, optionally alkyl-substituted diisocyanato-diphenyl methane and/or
  (ab) at least one dialkyl-malonate-blocked NCO-prepolymer based on excess quantities of optionally alkyl-substituted diisocyanatodiphenyl methane and organic compounds containing at least two hydroxyl groups and
(b) a polyol component having an average hydroxyl functionality of greater than 2 and a content of alcoholic hydroxyl groups of from about 1.5 to 8% by weight, comprising at least one polyester polyol in quantities corresponding to an equivalent ratio of blocked isocyanate groups to hydroxyl groups of from about 0.6:1 to 2:1.

The present invention also relates to a process for the production of coatings by coating heat-resistant substrates of any type with these coating compositions and subsequently hardening the coating at about 90° to 220° C.

5 Claims, No Drawings

COATING COMPOSITIONS AND PROCESS FOR THE PRODUCTION OF POLYURETHANE COATINGS

BACKGROUND OF THE INVENTION

1. Field of the Invention

This invention relates to new thermally crosslinkable one-component coating compositions containing blocked isocyanate groups and to their use for the production of highly elastic polyurethane coatings.

2. Description of the Prior Art

The use of blocked isocyanates for the production of thermosetting polyurethane coatings is known (cf. for example Kunststoff-Handbuch, Vol. VII, Polyurethane, Carl Hanser Verlag Munich, 1966, pages 11–13 and 21 et seq.). Numerous compounds capable of reversibly blocking isocyanates have been described. Among these compounds, particular importance is attributed to the class of C-H-acid compounds (examples: malonic acid and acetoacetic acid esters) by virtue of their favorable chemical and physiological properties (cf. for example German Offenlegungsschrift Nos. 2,342,603; 2,436,872; 2,550,156; 2,612,783; 2,612,784 and 2,612,785). German Offenlegungsschrift No. 2,550,156 and German Auslegeschrift Nos. 2,623,081 and 2,639,491 describe polyurethane stoving lacquers based on aliphatic polyisocyanates blocked by malonic acid esters or acetoacetic acid esters and organic polyhydroxyl compounds.

The systems described in the cited publications have the typical properties of surface lacquers, such as extreme hardness, gloss, resistance to yellowing and weathering.

However, previous tests (cf. the Comparison Tests described hereinafter) have shown that the polyurethane stoving lacquers according to the cited publications are not really suitable for the production of coatings characterized by very high shock and impact strength. However, there is an increasing need for coating compositions with which it is possible to produce shock- and impact-resistant coatings for protecting surfaces of industrial goods, such as for example machine parts, motor vehicle bodies or transport containers.

Hitherto, coating compositions based on bitumen or PVC or special amine cross-linked polyurethane systems (German Auslegeschrift No. 2,131,299) have been used for this purpose. The first of these systems based on bitumen or PVC are attended by the disadvantage that adequate protection is only guaranteed by substantial layer thicknesses of more than 1 mm. The result of this is that the coatings are very heavy and, because of their surface texture, cannot be high-gloss-lacquered. For reasons of appearance, therefore, they can only be applied to less visible parts of bodywork and not to every part requiring optimal protection against chipping by stones. Although the amine cross-linked polyurethane systems mentioned above guarantee a highly elastic protective surface coating in considerably thinner layers, they are attended by the disadvantage that they have to be stoved at relatively high energy consumption levels (60 minutes/140°–160° C. or 30 minutes/160° C. or 10 minutes/180° C.) and that low molecular weight amines can escape during the stoving process, releasing strong and, in addition, possibly toxic fumes.

The object of the present invention is to provide amine-free, toxicologically acceptable coating compositions which harden at comparatively low temperatures and guarantee highly elastic protective surface coatings in comparatively thin layers. In addition, the coating compositions are intended to be able to be applied as one-component compositions and to be liquid and stable in storage at room temperature despite their low solvent content.

According to the invention, this object is achieved by the provision of the coating compositions according to the invention described in detail hereinafter which contain as their polyisocyanate component certain dialkyl-malonate-blocked polyisocyanates of the diphenyl methane series and/or dialkyl-malonate-blocked NCO-prepolymers based on polyisocyanates of this type and, as their polyhydroxyl component, certain polyester polyols.

Dialkyl-malonate-blocked polyisocyanates of the type mentioned have hitherto been known as binders for moisture-hardening sealing compounds (U.S. Pat. No. 3,779,794). On account of the totally different hardening mechanism of the systems described in this publication, they differ fundamentally from the coating compositions according to the invention described in detail hereinafter. In addition, the materials obtained in accordance with U.S. Pat. No. 3,779,794 are comparatively soft and mechanically weak with tensile strengths of less than 1 MPa and, although suitable for use as sealing compounds for fitting panes of glass, particularly in the car making industry, they cannot be used as coatings capable of withstanding severe mechanical stressing. By contrast, it is possible by the process according to the invention as described in detail hereinafter to produce coatings which have a tensile strength of the order of 20 to 30 MPa and, hence, are capable of withstanding severe mechanical stressing.

SUMMARY OF THE INVENTION

The present invention relates to thermally cross-linkable coating compositions which are liquid and stable in storage at room temperature and which contain combinations of dialkyl-malonate-blocked polyisocyanates and organic polyhydroxyl compounds as binders and, optionally, auxiliaries and additives, being characterized in that binder comprises (a) a polyisocyanate component containing dialkyl-malonate-blocked isocyanate groups and a content of blocked isocyanate groups, expressed as NCO, based on the weight of the polyisocyanate component excluding the weight of the blocking agent, of from about 3 to 33.6% by weight, comprising (aa) at least one dialkyl-malonate-blocked, optionally alkyl-substituted diisocyanato-diphenyl methane and/or (ab) at least one dialkyl-malonate-blocked NCO-prepolymer based on excess quantities of optionally alkyl-substituted diisocyanatodiphenyl methane and organic compounds containing at least two hydroxyl groups and (b) a polyol component having an average hydroxyl functionality of greater than 2 and a content of alcoholic hydroxyl groups of from about 1.5 to 8% by weight, comprising at least one polyester polyol in quantities corresponding to an equivalent ratio of blocked isocyanate groups to hydroxyl groups of from about 0.6:1 to 2:1.

The present invention also relates to a process for the production of coatings by coating heat-resistant substrates of any type with a coating composition which hardens under the effect of heat and which contains as binder combinations of blocked polyisocyanates with organic polyhydroxyl compounds, and subsequently hardening the coating at about 90° to 220° C., characterized in that coating compositions of the type mentioned above are used as the coating composition.

DETAILED DESCRIPTION OF THE INVENTION

It is essential to the invention that the coating compositions according to the invention contain as binder combinations of a certain polyisocyanate component (a) with a certain polyhydroxyl component (b).

The isocyanate groups of the polyisocyanate component (a) are blocked by dialkyl malonate (malonic acid dialkyl ester). Based on the weight excluding the weight of the blocking agent, the polyisocyanate component (a) has an isocyanate content, expressed as NCO (molecular weight=42), of from about 3 to 33.6% by weight and preferably from about 5 to 25% by weight. It comprises the above-mentioned component (aa) and/or the above-mentioned component (ab).

Optionally alkyl-substituted diisocyanatodiphenyl methanes suitable for the production of polyisocyanate component (a) are any compounds or mixtures of compounds corresponding to the following formula:

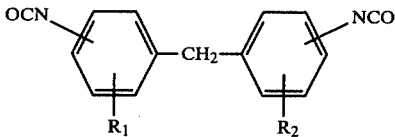

in which
$R_1$ and $R_2$ are the same or different and represent hydrogen or a $C_1-C_{18}$-alkyl radical, preferably hydrogen or a methyl radical.

Diisocyanates corresponding to the above general formula, in which both radicals $R_1$ and $R_2$ represent hydrogen or in which one of these two radicals represents hydrogen and the other a methyl group, are particularly suitable. Examples of suitable diisocyanates are 2,4'- and 4,4'-diisocyanatodiphenyl methane and mixtures thereof optionally containing 2,2'-diisocyanatodiphenyl methane in small quantities, 3,3'-dimethyl-4,4'-diisocyanatodiphenyl methane, the isomers obtainable in accordance with European patent application No. 80 10 4883.6 (U.S. application Ser. No. 182,569 filed Aug. 29, 1980), methyl-substituted diisocyanato-diphenyl methanes, i.e. in particular 3,4'-diisocyanato-4-methyl-diphenyl methane, 3,4'-diisocyanato-6-methyl diphenyl methane, 2,3'-diisocyanato-4'-methyldiphenyl methane and/or 2,3'-diisocyanato-6'-methyl diphenyl methane or mixtures of these isomers. The corresponding diisocyanates or diisocyanate mixtures containing higher alkyl radicals as substituents and obtainable in accordance with German patent application No. 30 32 128.9 are also suitable.

Compounds containing hydroxyl groups suitable for the production of polyisocyanate component (ab) are in particular simple dihydric or trihydric aliphatic alcohols having a molecular weight in the range from about 62 to 200, the polyols containing ether groups known per se from polyurethane chemistry and having a molecular weight in the range from about 106 to 5000 and preferably in the range from about 500 to 4000 or the polyester polyols known per se from polyurethane chemistry having a molecular weight in the range from about 178 to 4000 and preferably in the range from about 400 to 3000.

Examples of suitable aliphatic alcohols are ethylene glycol, 1,2- and 1,3-propane diol, 1,3- and 1,4-butane diol, the isomeric pentane diols, hexane diols or octane diols such as, for example, 2-ethyl-1,3-hexane diol, trimethylol propane or glycerol.

Examples of suitable polyols containing ether groups are diethylene glycol, dipropylene glycol or the ethoxylation and/or propoxylation products of suitable difunctional to tetrafunctional starter molecules known per se from polyurethane chemistry, such as for example the simple alkane polyols mentioned above, or of water, ammonia, ethylene diamine, aniline or triethanolamine. Preferred polyols containing ether groups are the polyether polyols known per se from polyurethane chemistry with molecular weights in the preferred range mentioned above.

Examples of suitable polyester polyols are in particular the reaction products—known per se in polyurethane chemistry—of polyhydric alcohols, for example alkane polyols of the type mentioned by way of example above, with sub-stoichiometric quantities of polycarboxylic acids or polycarboxylic acid anhydrides, particularly dicarboxylic acids or dicarboxylic acid anhydrides. Polycarboxylic acids or polycarboxylic acid anhydrides suitable for producing the polyester polyols are, for example, oxalic acid, succinic acid, adipic acid, sebacic acid, phthalic acid, isophthalic acid, phthalic acid anhydride, tetrahydrophthalic acid anhydride, hexahydrophthalic acid anhydride, maleic acid, maleic acid anhydride, fumaric acid or dimeric and trimeric fatty acids. It is of course possible in the production of the polyester polyols to react any mixtures of the polyhydric alcohols mentioned by way of example above with any mixtures of the acids or acid anhydrides mentioned by way of example above.

The NCO-prepolymers on which polyisocyanate component (ab) is based are produced in known manner by reacting excess quantities of diisocyanates of the type mentioned by way of example above with polyfunctional hydroxyl compounds of the last type mentioned by way of example. An NCO/OH equivalent ratio of from about 1.2:1 to 20:1 is generally maintained during this reaction, an NCO/OH-equivalent ratio of from about 1.5:1 to 10:1 being preferred. Where an excess of diisocyanate is used, mixtures of prepolymers (ab) with simple diisocyanates (aa) are formed and, in dialkylmalonate-blocked form, may be used as such in the coating compositions according to the invention.

To produce polyisocyanate component (a), the diisocyanates and/or NCO-prepolymers are blocked with dialkyl malonate in known manner. In the context of the invention, the expression "dialkyl malonate" is understood to include the diesters of malonic acid both with $C_1-C_8$-alkanols, such as methanol, ethanol, n-propanol, n-butanol, isobutanol, n-hexanol, n-octanol or iso-octanol, and also with cycloaliphatic alcohols, such as cyclopentanol or cyclohexanol and with araliphatic alcohols, such as benzyl alcohol or 2-phenyl ethanol. However, it is particularly preferred to use diethyl malonate (malonic acid diethyl ester) as the blocking agent. The blocking reaction is carried out in known manner (cf. German Offenlegungsschrift No. 2,342,603 or German Offenlegungsschrift No. 2,550,156) using basic catalysts, such as for example sodium phenolate, sodium methylate or other alkali alcoholates. Other organic alkali compounds, such as sodium malonate for example, may also be used. The catalysts are used in a quantity of from about 0.1% to 2%, based on the total weight of the reaction components. The quantity of dialkyl malonate used should amount to at least 1 mole per isocyanate equivalent. However, it is best to use about a 5 to 20% excess of blocking agent.

It is also possible in principle to only partly block a diisocyanate which, although corresponding to the definition (aa), is unblocked, so that for example from about 40 to 90% of the isocyanate groups are present in blocked form and then to react the partly blocked diisocyanate with a polyol component of the type mentioned by way of example above to form component (ab) or a mixture of component (ab) with component (aa).

Combinations of components (a) and (b) according to the invention may be similarly produced not only as described hereinafter by mixing the individual components but also by partly blocking polyisocyanates or polyisocyanate mixtures which, although corresponding to the definition (aa) and/or (ab), are unblocked, so that for example up to about 30% of the NCO-groups are still present in free form, and subsequently adding the polyester polyols described hereinafter suitable for use as component (b) in such a quantity that, after the spontaneous addition reaction between the free NCO-groups and some of the hydroxyl groups of the polyester polyol, a mixture of blocked polyisocyanates corresponding to the definition (ab) and optionally (aa) and excess polyester polyol (b) is present, in which the equivalent ratio of blocked NCO-groups to hydroxyl groups lies within the range according to the invention, i.e. from about 0.6:1 to 2:1.

The blocking reaction may be carried out in the absence of solvents or in the presence of solvents which are inert to isocyanates. Suitable solvents of this type are, for example, ethyl acetate, methyl glycol acetate, ethyl glycol acetate, diethylene glycol monomethyl ether acetate, methyl ethyl ketone, methyl isobutyl ketone, toluene, xylene and the relatively high boiling hydrocarbon mixtures normally used in lacquer chemistry.

The solvents mentioned above may be used either individually or in admixture with one another. Instead of using solvents, it is also possible to use plasticizers such as, for example, standard commercial phosphoric acid esters, phthalic acid esters or sulfonic acid esters.

The low boiling solvents in particular mentioned by way of example may be removed by distillation after the blocking reaction, leaving substantially solvent-free dialkyl-malonate-blocked polyisocyanates as component (a). However, it is also possible not to remove the solvents or plasticizers mentioned by way of example, although it is preferred to gauge the quantity in which they are used in such a way that the coating compositions according to the invention have a solids content of at least about 60% by weight and preferably from about 70 to 90% by weight.

Component (b) of the coating compositions according to the invention may consist of selected polyester polyols or selected mixtures of polyester polyols having an (average) OH-functionality of greater than 2. This means that, in addition to the usual difunctional synthesis components (dicarboxylic acids and diols), from about 3 to 20 equivalent percent and preferably from about 8 to 15 equivalent percent, based on the total quantity of starting materials used in the production of the polyester, of at least trifunctional synthesis components having to be used in the production of these polyesters polyols, or that, where mixtures of separately produced polyester polyols are used, the proportion of at least trifunctional synthesis components, based on all of the synthesis components used in the production of the individual polyester polyols, satisfies this requirement. Thus, it is possible for example to mix difunctional polyester polyols with higher polyester polyols in order thus to obtain a polyester mixture which satisfies the above-mentioned requirement in regard to the average hydroxyl functionality. In addition, polyol component (b) contains from about 1.5 to 8% by weight and preferably from about 3 to 6% by weight of alcoholic hydroxyl groups.

In principle, any polyester polyols which correspond to the above definitions are suitable for use in the coating compositions according to the invention. This means that any of the starting materials mentioned by way of example above may also be used for the production of polyester component (b). However, preferred polyester polyols (b) are those in which at least about 80 hydroxyl equivalent percent and preferably about 100 hydroxyl equivalent percent of the alcohol component comprises 1,4-butane diol, 1,6-hexane diol and/or diethylene glycol and trimethylol propane and in which at least about 50 and preferably about 70 carboxyl equivalent percent of the acid component comprises phthalic acid or phthalic acid anhydride and/or isophthalic acid. Polyester polyols (b) produced with 1,6-hexane diol, trimethylol propane, isophthalic acid and phthalic acid or phthalic acid anhydride are especially preferred.

The polyester polyols (b) are produced by known methods of the type described for example in Houben-Weyl, Methoden organischen Chemie, Vol. XIV/2, G. Thieme Verlag, Stuttgart, 1963, pages 1 to 47.

To produce the binders present in the coating compositions according to the invention, polyisocyanate component (a) and polyester component (b) are mixed in such a way that the quantitative ratios correspond to an equivalent ratio of blocked isocyanate groups to hydroxyl groups of from about 0.6:1 to 2:1 preferably from about 0.9:1 to 1.4:1. It is important to ensure that the components are mixed below that temperature at which the blocked NCO-groups are capable of reacting with the OH-groups. Since the gelation temperature of the systems according to the invention is above +50° C. (cf. the storability tests described in the following), this requirement is not difficult to satisfy.

The mixtures of components (a) and (b) are the binders present in the coating compositions according to the invention. As already mentioned in the description of the production of polyisocyanate component (a), the coating compositions according to the invention may contain solvents or plasticizers in addition to these binders. As mentioned above, these auxiliaries may be added either during the actual production of the blocked polyisocyanates (a) or even at some later stage. In this connection, however, it must be emphasized that, for their most important application, i.e. the production of high-impact coatings, the coating compositions according to the invention are preferably processed in low-solvent form, although in principle the use of large quantities of solvent cannot be ruled out. Accordingly, the coating compositions according to the invention preferably have solids contents of more than about 60% by weight and, more particularly, from about 70 to 90% by weight.

In addition to the binder essential to the invention and the already mentioned solvents or plasticizers optionally present, the coating compositions according to the invention may also contain any auxiliaries and additives known per se in lacquer technology, such as pigments, fillers, leveling aids or catalysts accelerating the cross-linking reaction. In particular, it is possible to add to the coating compositions according to the invention additives which improve protection against corrosion, such as for example compounds containing epoxide groups, for example the known condensation products of 4,4'-dihydroxy-2,2-diphenyl propane (bisphenol A) and epichlorohydrin. The quantity in which these generally solid auxiliaries and additives are used must be taken into account in calculating the solids content mentioned above.

The coating compositions according to the invention are mixtures which are liquid and stable in storage at room temperature.

To carry out the process according to the invention for producing coatings using the coating compositions according to the invention, the coating compositions are applied in one or more layers to any heat-resistant substrates by methods known per se, for example by spray coating, spread coating, dip coating, flood coating or by means of rolls or coating knives. The process according to the invention is suitable for the production of coatings on metals, plastics, wood or glass. The process according to the invention is particularly suitable for the production of coatings on sheet steel of the type used for example in the manufacture of motor vehicle bodies, machines, claddings, casks or containers. The substrates to be coated in the process according to the invention may be suitably primed before the process according to the invention is carried out. In the application of the process according to the invention, the quantity in which the coating compositions according to the invention is used is generally gauged in such a way as to produce dry layer thicknesses of from about 0.1 to 0.2 mm. However, it is also possible to produce considerably thicker layers.

After the substrates mentioned by way of example have been coated with the coating compositions according to the invention in the process according to the invention, the compositions are hardened by heating to about 90°–220° C. and preferably to about 110°–150° C. To save energy, use will of course be made of the advantage of the low stoving temperatures. However, it is of considerable importance for practical purposes that the coatings do not undergo any thermal degradation even at relatively high temperatures such as can occur for example in the event of operational faults in lacquering machines.

The hardened coatings may readily be provided with surface lacquers should this be necessary for aesthetic reasons. This is made possible by the fact that the coating compositions according to the invention may be applied in comparatively thin layers. In contrast to the high-impact coatings of the prior art which have to be applied in thick layers, they do not present any problems in regard to leveling and surface texture and may therefore be high-gloss-lacquered. This property enables the coating compositions according to the invention to be used in areas where, hitherto, an elastic protective surface layer could not be applied for aesthetic reasons, as for example on the clearly visible parts of vehicle bodies which are exposed to severe mechanical stressing by chipping.

The surface protection obtainable by the process according to the invention is demonstrated in the following Examples. It is emphasized that the impact strength of the coatings is attributable to a combination of high elasticity and good adhesion to the substrates to be protected. All percentages represent percentages by weight.

EXAMPLE 1

400 g of a 1,2-propane diol-started polypropylene oxide polyether having an OH number of 112 and 400 g of an ethylene-diamine-started polypropylene oxide polyether having an OH number of 60 are added to 1000 g of a mixture of 40% of 3,4'-diisocyanato-4-methyl-diphenyl methane, 25% of 3,4'-diisocyanato-6-methyl diphenyl methane, 20% of 2,3'-diisocyanato-4'-methyl diphenyl methane and 15% of 2,3'-diisocyanato-6'-methyl diphenyl methane. After heating for 3 hours to 60° C., the prepolymer formed has an NCO content of 14.4%. It is then diluted with 830 g of a standard commercial lacquer solvent (a mixture of aromatic hydrocarbons boiling at temperatures in the range from 183° to 207° C.), followed by cooling to room temperature. 1064 g of malonic acid diethyl ester in which 16 g of sodium phenolate have been dissolved are then added with stirring. A mildly exothermic reaction takes place, coming to a standstill at around 50° C. After the reaction has abated, the product is stirred for about 8 hours at room temperature until no more NCO-groups can be detected by IR-spectroscopy.

2463 g of a polyester of 1,6-hexane diol and trimethylol propane (molar ratio 4:1), isophthalic acid and phthalic acid (molar ratio 5:1) prepared at a molar OH/COOH ratio of 1.75:1 and having a hydroxyl number of 150, which has been diluted with 830 g of the lacquer solvent mentioned above, are added to the blocked isocyanate thus obtained. A pale yellow, clear product having a solids content of 75% is obtained, its viscosity amounting to 5300 mPas at 20° C.

To test stability in storage, a sample of the mixture is stored in a sealed vessel at +50° C. After 4 weeks at that temperature, the viscosity amounts to 15000 mPas (20° C.). Storage for 6 months at room temperature does not produce any significant increase in viscosity. This shows that the product is stable enough in storage to be used as a one-component coating composition. A phosphated steel plate primed in the usual way by electrical dip coating using Cathodip FT 85/9480 of BASF AG, Germany, as primer is sprayed with the mixture according to Example 1. The coating thus applied is then hardened by stoving for 30 minutes at 130° C. Layer thickness: 150 μm (dry film).

The coated plate is subjected to a test normally applied in the motor vehicle industry which simulates the mechanical stressing of lacquers by loose chippings. In this test, basalt chippings are projected onto the plate to be tested under a predetermined pressure using a compressed-air projecting apparatus. The so-called bombardment time which is required to break through the coating down to the metal is taken as a measure of the quality of the coating.

The bombardment times for the coating according to Example 1 are compared in Table 1 with those for the prior art coatings (Comparison Examples 2 and 3).

The comparison demonstrates the technical advance obtained in accordance with the invention. The polymer obtained by thermal cross-linking from the mixture according to Example 1 is further characterized by the following mechanical data:

| tensile strength | (DIN 53504) | 20 MPa |
| breaking elongation | (DIN 53504) | 220% |

EXAMPLE 2

(Comparison Example with DE-OS No. 2,550,156)

A one-component coating composition is prepared from 1000 g of a blocked isocyanate of isophorone diisocyanate, trimethylol propane and malonic acid diethyl ester according to Example 2 of DE-OS No. 2,550,156 and 1200 g of the polyester of 1,6-hexane diol, trimethylol propane, isophthalic acid and phthalic acid described above in Example 1. The mixture is dissolved to form a 75% solution in the lacquer solvent indicated in Example 1 and is applied in the same way as in Example 1 to phosphated and primed steel plates. After stoving for 30 minutes at 130° C. (dry film thickness: 150 μm), the bombardment test described in Example 1 is carried out. The comparison in Table 1 shows that the coatings according to DE-OS No. 2,550,156 shows far less resistance to loose chippings than the coating according to the invention.

EXAMPLE 3

(Comparison Example with DE-AS No. 2,639,491)

1000 g of the adduct of hexamethylene diisocyanate/biuret polyisocyanate and acetoacetic acid ethyl ester (75% solution) described as "blocked isocyanate 1" in DE-AS No. 2,639,491 are mixed with 2490 g of the polyester polyol of 2,2-dimethyl-1,3-propane diol, adipic acid, trimethylol propane and phthalic acid (70% solution) similarly described as "polyester solution 1" in DE-AS No. 2,639,491. The product thus obtained is applied to phosphated and primed steel plates in the same way as described in Example 1. The bombardment test described in Example 1 is carried out after stoving for 30 minutes at 130° C. (dry film thickness: 150 μm). The comparison in Table 1 shows that the coating according to DE-AS No. 2,639,491 has far less resistance to loose chippings than the coating according to the invention.

EXAMPLE 4

563 g of the mixture according to the invention produced in accordance with Example 1 are ground in a dissolver with 63.6 g of titanium dioxide, 6.4 g of iron oxide black pigment, 17 g of a standard commercial de-aerating agent, 86 g of talcum, 121 g of ethyl glycol acetate, 121 g of an aromatic hydrocarbon mixture (boiling range: 183°-207° C.) and 22 g of a commercial silica-based thixotropic agent (Aerosil 130 of Degussa, Germany).

A one-component coating composition ready for use is obtained in this way, being suitable for the production of non-chip primers. Steel plates coated with this product in the same was as described in Example 1 produce good results in the bombardment test (see Table 1).

EXAMPLE 5

This Example describes the production of a one-component coating composition using 4,4'-diisocyanato-diphenyl methane.

320 g of malonic acid diethyl ester, in which 1 g of a 30% sodium methylate solution in methanol is dissolved, are added at room temperature to 250 g of 4,4'-diisocyanato-diphenyl methane. The reaction mixture is then heated to 60° C., a clear liquid being formed in a mildly exothermic reaction. After 8 hours at the temperature of 60° C., the NCO-content of the mixture amounts to 2.5%. A solution of 747 g of a polyester in 330 g of ethyl glycol acetate is then added all at once and the reaction continued at 63° C. until no more NCO-groups can be detected (composition of the polyester: 29.6% of isophthalic acid, 10.1% of adipic acid, 5.9% of o-phthalic acid, 42.4% of 1,6-hexane diol, 12.0% of trimethylol propane, hydroxyl No.: 145). An 80% solution of a one-component stoving lacquer is obtained. Steel plates coated with this product in the same way as in Example 1 shows useful properties in the bombardment test (see Table 1).

Mechanical data of the thermally cross-linked polymers:

| tensile strength | (DIN 53504) | 31.5 MPa |
| breaking elongation | (DIN 53504) | 140% |

EXAMPLE 6

This Example describes the production of a particularly elastic one-component lacquer using 4,4'-diisocyanato-diphenyl methane.

Following the procedure described in Example 5, 250 g of 4,4'-diisocyanato-diphenyl methane are reacted with 260 g of malonic acid diethyl ester in the presence of 1 g of sodium methylate. The still free NCO-groups are reacted with 323 g of a hydroxyl polyester of 1,6-hexane diol, neopentyl glycol (molar ratio 1:1) and adipic acid (average molecular weight approximately 1700) and the masked polyisocyanate is dissolved to form an 80% solution in ethyl glycol acetate.

730 g of an 80% ethyl glycol acetate solution of a polyester of 29.6% of isophthalic acid, 10.1% of adipic acid, 5.9% of o-phthalic acid, 42.4% of 1,6-hexane diol and 12.0% of trimethylol propane having a hydroxyl number of 145 are then added at room temperature.

Steel plates are coated with this one-component stoving lacquer in the same way as in Example 1. The results of the bombardment tests in Table 1 demonstrate the suitability of the product as an elastic, protective surface coating.

EXAMPLE 7

This Example describes the production of a one-component coating composition using a mixture of 2,4'- and 4,4'-diisocyanato-diphenyl methane.

Following the procedure of Example 5, 1000 g of a mixture of 40% of 2,4'- and 60% of 4,4'-diisocyanato-diphenyl methane are reacted with 960 g of malonic acid diethyl ester in the presence of 3 g of sodium methylate. The NCO-groups still present are then reacted with 143 g of 2-ethyl-1,3-hexane diol and the product which does not contain any more free NCO-groups is dissolved to form an 80% solution in xylene/ethyl glycol acetate (1:1).

2900 g of an 80% polyester solution in xylene/ethyl glycol acetate 1:1 (composition of the polyester: 29.6% of isophthalic acid, 10.1% of adipic acid, 5.9% of o-phthalic acid, 42.4% of 1,6-hexane diol, 12.0% of trimethylol propane, hydroxyl No.: 145) are then added at room temperature.

Steel plates are coated with this one-component stoving lacquer in the same way as in Example 1. The results of the bombardment tests are shown in Table 1.

EXAMPLE 8

A mixture of 760 g of a polyether based on triethanolamine and propylene oxide with a hydroxyl No.: of 148, 1700 g of a polyester based on adipic acid, 1,6-hexane diol and neopentyl glycol (molar ratio of diols=1:1) with a hydroxyl No.: of 66 and 45 g of trimethylol propane is diluted with 2040 g of ethyl glycol acetate. 1250 g of 4,4'-diisocyanato-diphenyl methane are rapidly introduced into this solution, followed by stirring for about 2 hours at 60° to 70° C. until the reaction mixture has an NCO-content of 3.2%. After cooling to 50° C., a mixture of 767 g of malonic acid diethyl ester and 14 g of sodium phenolate is added. The blocking reaction is mildly exothermic so that the temperature rises to 70° C. After stirring for 1 hour, the mixture is left to cool to room temperature and 2600 g of a 70% solution of a polyester in ethyl glycol acetate having the composition indicated in Example 7 are added to the blocked isocyanate thus obtained.

Steel plates are coated with this one-component stoving lacquer in the same was as in Example 1. The results of the bombardment tests are shown in Table 1.

TABLE 1

Results of the bombardment tests

| Coating (30 mins./130° C., 150 μm) | Bombardment time* Bombardment pressure: 0.6 bar + 1.05 bars |
|---|---|
| Example 1 | 10 mins. + 7 mins. |
| Comparison Example | 6.5 mins. — |
| Comparison Example 3 | 4.5 mins. — |
| Example 4 | 10 mins. + 3.5 mins. |
| Example 5 | 10 mins. + 5 mins. |
| Example 6 | 10 mins. + 8.5 mins. |
| Example 7 | 10 mins. + 5.5 mins. |
| Example 8 | 10 mins. + 8 mins. |

*The test plates were first bombarded under a pressure of 0.6 bar. In the case of those coatings which were still intact after 10 minutes, the bombardment pressure was increased to 1.05 bars. For further explanations, see Example 1.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A thermally cross-linkable coating composition which is liquid and stable in storage at room temperature and which contains combinations of dialkyl-malonate-blocked polyisocyanates and organic polyhydroxyl compounds as binder and, optionally, auxiliaries and additives, characterized in that said binder comprises
    (a) a polyisocyanate component containing dialkyl-malonate-blocked isocyanate groups and a content of blocked isocyanate groups, expressed as NCO, based on the weight of the polyisocyanate component excluding the weight of the blocking agent, of from about 3 to 33.6% by weight comprising
        (aa) at least one dialkyl-malonate-blocked, optionally alkyl-substituted diisocyanato-diphenyl methane and/or
        (ab) at least one dialkyl-malonate-blocked NCO-prepolymer based on excess quantities of optionally alkyl-substituted diisocyanato-diphenyl methane and organic compounds containing at least two hydroxyl groups and
    (b) a polyol component having an average hydroxyl functionality of greater than 2 and a content of alcoholic hydroxyl groups of from about 1.5 to 8% by weight, comprising at least one polyester polyol, in quantities corresponding to an equivalent ratio of blocked isocyanate groups to hydroxyl groups of from about 0.6:1 to 2:1.

2. The coating composition as claimed in claim 1, characterized in that component (a) comprises diethyl-malonate-blocked, optionally methyl-substituted diisocyanato-diphenyl methane (aa) and/or a diethyl-malonate-blocked NCO-prepolymer (ab) based on an optionally methyl-substituted diisocyanato-diphenyl methane.

3. The coating composition as claimed in claim 1, characterized in that component (b) comprises a polyester polyol based on (i) 1,4-butane diol, 1,6-hexane diol, diethylene glycol and/or trimethylol propane and (ii) phthalic acid and/or isophthalic acid.

4. The coating composition as claimed in claim 2, characterized in that component (b) comprises a polyester polyol based on (i) 1,4-butane diol, 1,6-hexane diol, diethylene glycol and/or trimethylol propane and (ii) phthalic acid and/or isophthalic acid.

5. A process for the production of a coating which comprises coating a heat-resistant substrate with the coating composition of claim 1, 2, 3 or 4 and subsequently hardening the coating at about 90° to 220° C.

* * * * *